United States Patent [19]

Waller

[11] 4,360,878

[45] Nov. 23, 1982

[54] METHOD FOR THE LIBRARY STORAGE OF A WORKPIECE PROGRAM FOR NUMERICALLY CONTROLLED MACHINE TOOLS

[75] Inventor: Siegfried Waller, Erlangen, Fed. Rep. of Germany

[73] Assignee: Siemens Aktiengesellschaft, Munich, Fed. Rep. of Germany

[21] Appl. No.: 163,961

[22] Filed: Jun. 30, 1980

Related U.S. Application Data

[63] Continuation of Ser. No. 943,302, Sep. 18, 1978, abandoned.

[30] Foreign Application Priority Data

Sep. 19, 1977 [DE] Fed. Rep. of Germany ....... 2742124

[51] Int. Cl.³ ............................................. G05B 19/42
[52] U.S. Cl. ................................... 364/474; 318/568; 364/171; 364/191
[58] Field of Search ... 364/474, 120, 107, 200 MS File, 364/900 MS File, 475, 167–171, 191–193; 318/568, 162; 346/33 MC; 360/15, 16, 17, 79

[56] References Cited

U.S. PATENT DOCUMENTS

| | | | |
|---|---|---|---|
| 3,217,331 | 11/1965 | Wetzel et al. | 318/568 |
| 3,725,652 | 4/1973 | Konvalina | 318/568 |
| 3,744,031 | 7/1973 | Avery et al. | 364/200 |
| 3,885,207 | 5/1975 | Du Bosque, Jr. | 346/33 MC X |
| 3,995,313 | 11/1976 | Fayling | 360/15 |
| 4,016,540 | 4/1977 | Hyatt | 364/200 |
| 4,042,866 | 8/1977 | Morita et al. | 318/568 |

Primary Examiner—Joseph F. Ruggiero
Attorney, Agent, or Firm—Kenyon & Kenyon

[57] ABSTRACT

A transportable semiconductor memory is used as working storage for the workpiece program in numerically controlled machine tools with manual input. The content of the semiconductor memory can be transferred to an external data carrier in a separate archive room.

3 Claims, 1 Drawing Figure

METHOD FOR THE LIBRARY STORAGE OF A WORKPIECE PROGRAM FOR NUMERICALLY CONTROLLED MACHINE TOOLS

This is a continuation of application Ser. No. 943,302 filed Sept. 18, 1978, abandoned.

BACKGROUND OF THE INVENTION

This invention relates to a method for the library storage of workpiece programs for numerically controlled machine tools in which the workpiece program is first entered into the working storage of the numerical control of a machine by means of a manual input keyboard and is later transferred to an external data carrier for data safekeeping and reuse.

Such a method is described, for instance, in the supplement "Controls and Drives for the Automation of Machine Tools" in Siemens-Zeitschrift, 1973, at pages 20 to 24.

Relatively simple numerical machine tool controls in which the workpiece program is manually put into the control on the machine are well known. It is desirable to make the program thus obtained available at a later time. Thus, methods providing magnetic tapes, punched tapes, etc. for the recording and storage of the program are also known. But the handling of the magnetic memories and the recording and playback equipment in the shop is relatively problematical because possible contamination means that dependable recording and playback cannot be absolutely guaranteed.

It is an object of the present invention to provide a simple and safe method for archiving the programs of numerically controlled machine tools having manual inputs.

BRIEF SUMMARY OF THE INVENTION

According to the invention, this problem is solved by means of a transportable semiconductor working memory which, being attached to the control, stores the workpiece program and then, being detached, is brought to an archive room separate from the machine room; there its contents may be re-recorded on an external data storage medium via a transfer circuit and a recording/playback instrument.

In this manner it is possible without much expense—since the working memory serves as the transfer medium at the same time—to re-record the program in a manner appropriate for large volume data storage, safekeeping and reuse.

DETAILED DESCRIPTION OF THE INVENTION

Figure 1:
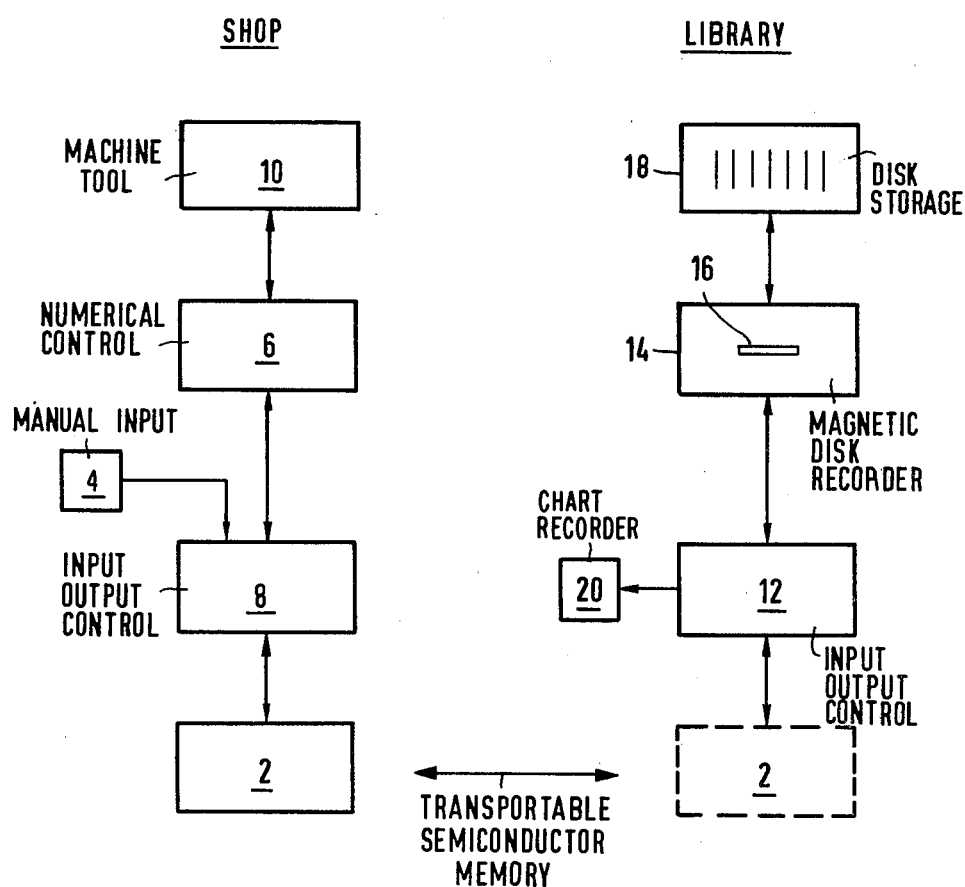
FIG. 1 is a block diagram illustrating the flow of program information between a machine tool and an archive according to the invention.

Reference is now made to FIG. 1. When a workpiece is machined for the first time in the shop, the workpiece program is read into the working memory 2 of the numerical control 6 of the machine tool by means of a manual input 4 via an input/output control 8. The working memory 2, connected to the control 6 via the input/output control 8, is a transportable semiconductor memory which is plugged into the control. This semiconductor memory is self-contained, and essentially interference-proof; i.e. it is highly insensitive to interference and contamination. After the workpiece is machined in accordance with the stored program, the working memory 2, containing the workpiece program is then unplugged from the input/output control 8 and transported to the archive or library room which is separated from the shop. There the transportable memory 2 is plugged into the input/output control 12 and the workpiece program is transferred via the control 12 onto a data carrier 16 in a recording and playback instrument 14. The recording instrument 14 may be of a kind well known in the industry; advantageously, a magnetic memory disk or diskette, such as the so-called floppy disk, is used as the storage medium. When the program has been transferred to a storage disk 16, the disk 16 may be filed in a suitable manner and so maintained ready for use. Since separate disks can be provided for each program, the complications in storage and storage programming involved with other methods of storage are eliminated.

For replay, the data carrier 16 assigned to a particular workpiece program is reinserted in the recording and playback instrument 14 and its content transferred to a working memory 2 through input/output control 12; as before, the working memory 2 takes the form of a transportable semiconductor memory. The loaded working memory 2 is then brought to the shop and there plugged into the numerical control of a machine tool where it serves to control the machine.

A chart recorder 20 may also be attached to the library input/output control 12 for documentation purposes.

What is claimed is:

1. A method for recording and storing workpiece programs for use with a numerically controlled machine tool having a manual input keyboard comprising:
   (a) providing the machine tool control with a working memory in the form of a transportable semiconductor memory capable of storing a complete workpiece program, the working memory adapted to be plugged into and unplugged from the numerically controlled machine tool;
   (b) each time that a new workpiece is to be prepared by the numerically controlled machine tool, programming the associated machining steps by means of the manual input keyboard and storing the workpiece program so generated in the working memory:
   (c) unplugging the working memory;
   (d) moving the working memory to a library storage room separate from the room in which the machine tool is located;
   (e) plugging the working memory into the input/output control of a recording/playback instrument; and
   (f) recording the contents of the working memory onto an external data carrier.

2. The method according to claim 1 wherein the external data carrier comprises a magnetic memory diskette, at least one such diskette being provided for each separate workpiece program.

3. The method according to claim 2 and further including the steps of:
   (a) when the previously recorded workpiece program is to be used again, unplugging the working memory from the numerically controlled machine tool and moving the working memory into the library storage room;

(b) plugging the working memory into the input/output control of the recording/playback instrument and recording the contents of the diskette containing the desired workpiece program in the working memory;

(c) returning the working memory to the numerically controlled machine tool; and (d) carrying out the workpiece program newly stored in the working memory on the machine tool.

* * * * *